2 Sheets—Sheet 1

J. C. COPE.
CAR-COUPLING.

No. 187,102. Patented Feb. 6, 1877.

Witnesses
B. C. Pole
J. W. Parish

Inventor
John C. Cope
By John B. Clark Jr
Attorney

2 Sheets—Sheet 2.

J. C. COPE.
CAR-COUPLING.

No. 187,102. Patented Feb. 6, 1877.

Witnesses
B. C. Pole
J. W. Parish

Inventor.
John C. Cope,
By John B. Clark Jr
Attorney.

UNITED STATES PATENT OFFICE.

JOHN C. COPE, OF PRICE'S BRANCH, MISSOURI.

IMPROVEMENT IN CAR-COUPLINGS.

Specification forming part of Letters Patent No. 187,102, dated February 6, 1877; application filed October 26, 1876.

*To all whom it may concern:*

Be it known that I, JOHN C. COPE, of Price's Branch, in the county of Montgomery and State of Missouri, have invented certain new and useful Improvements in Car Self-Couplers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to produce a self-locking car-coupling; and the nature thereof is in constructing a link, which possesses certain features, whereby, when forced or plunged into the draw-head, it will self-couple, all of which is dependent upon a certain construction of the draw-head; also, to produce a ready means of operating the same, so that by the action of a double lever, being a single rod bent up to either side of the cars, they can be uncoupled from the side or top, if desired. The lever may be set, so as to prevent coupling; also, certain modifications in the before-mentioned link, whereby there is provision made for the varying heights of cars, all of which is hereinafter more fully described, reference being had to the accompanying drawings, in which—

Figure 1:
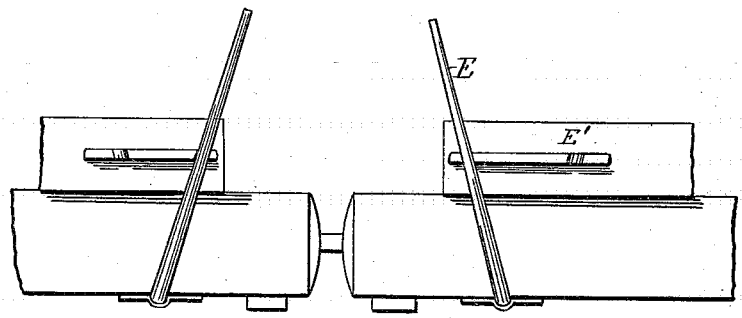
Figure 2:
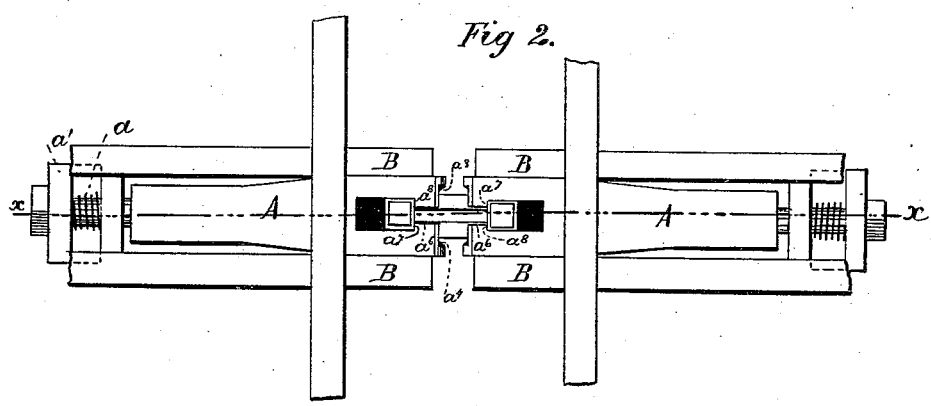
Figure 3:
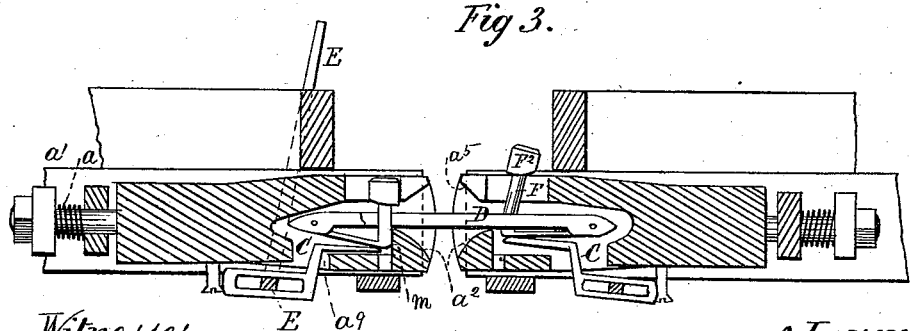
Figure 4:
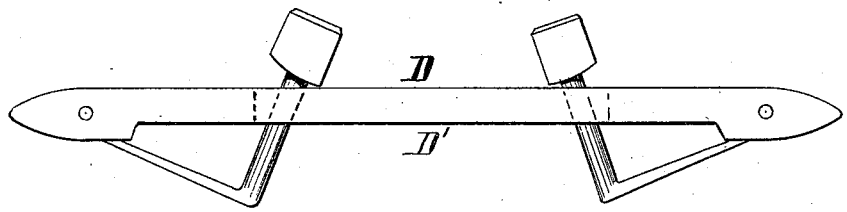
Figure 5:
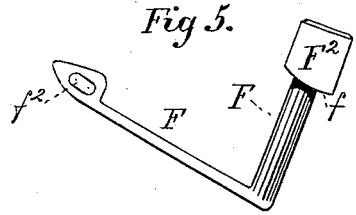
Figure 6:
Figure 7:
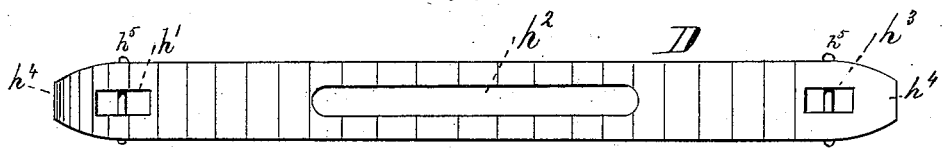
Figure 8:
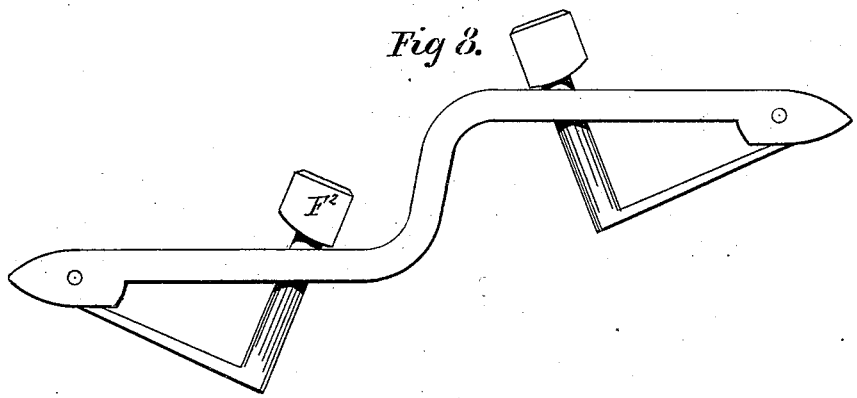

Figure 1 is side elevation of my coupler, showing the draw-heads and link in position, coupled; Fig. 2, plan of Fig. 1; Fig. 3, sectional elevation on line $x\ x$ of Fig. 2; Fig. 4, side elevation of link; Fig. 5, side elevation of the diagonal hinged bolt; Fig. 6, side elevation of the trip or trigger; Fig. 7, plan of link, with bolts removed; Fig. 8, side elevation of bent link, with diagonal hinged bolts adjusted therein.

In all the same letters refer to the same parts.

To enable others skilled in the art to make and use my invention, I will proceed to describe the construction and operation thereof.

The draw-head A, which is placed between the timbers B, is allowed perpendicular motion, and is provided with springs $a$, cross-head $a^1$, for horizontal springing motion. The said draw-head, with the sides B, is bolted to the platform, as is usually done. In the front of the draw-head is an oblong opening, and at the lower part a covered face, $a^2$; also, to either side the chamfered sides $a^3\ a^4$, the upper part has the same chamfer $a^5$, and the center of this upper part is cut out at $a^6$. This first cut widens after passing back, and forms the shoulders $a^7\ a^8$. The under side of the draw-head A is cut out at $a^9$ for the entrance of the trip or trigger C. This enters the draw-head through the cut-out $a^9$, and is made to work up and against the connecting-links D, and diagonal drop hinged bolt F, to be hereafter described. To allow for horizontal motion of the trip or trigger C, the lower end $c'$ is slotted out for the square part of the lever E. This consists of a single rod bent at either end and squared up in the center, said center part passing through the slotted-out part of C, allowing the free motion of the same along the slot, but turning or tilting the interior trigger C when turned.

The link D is a flattened piece of metal, having oblong openings $h^1$, $h^2$, and $h^3$, the opening $h^2$ being the longest. The ends $h^4$ of the link are tapered off all four ways. The central part of the link at D is thinner than the ends $h^4$, or the ends $h^4$ are thickened up; and in these thickened ends $h^4$ the oblong openings $h^1\ h^3$ and pins $h^5$ are placed, into which is inserted the end of the tie F of the diagonal drop-bolt $F^1$. This tie is connected with the bolt $F^1$, which passes through openings $h^2$, and the head $F^2$, which may be round or square, has the curved-inward faces $f$, as shown in Figs. 4 and 5. It will be readily seen that the same construction of diagonal drop-bolt may be added to the bent link, as shown by Fig. 8.

In the operation of this invention the cars which it may be desired to couple are, in the usual manner, run together, and the link D, being in position and coupled to one car, enters the draw-head, and rises or falls, according to the curvature $a^2$, and, the link continuing to enter the draw-head, the diagonal bolt $F^1$ is thrown up, so that the upper portion passes through the opening $a^6$ in the top of same, and upon the link being forced into its position, then the diagonal bolt $F^1$ falls down, and becomes engaged at the head $F^2$ against the shoulders $a^7$ and $a^8$, and the bottom of the bolt $F^1$ is against the shoulders $m$, which is the back of the curved surface $a^2$ of the draw-head A. The oval opening $f^2$ of the tie F allows the full strength of the bolt $F^1$ to be exerted against the shoulders, and, as will be readily seen, the draft of the link D is brought squarely against the bolt $F^1$. It will be seen that the bolt-hole in the draw-head A is entirely through, permitting the use of the ordinary link with a pin, which shall have the head enlarged to correspond with my system.

Should it be desired that the cars running together should not couple, then the trip or trigger C is set up by means of the bent rod, double lever E, and by the means of the ratchet $E^1$ upon the side of the car, is held in whatsoever position it may be placed. The cars may be coupled or uncoupled from the top of the same, or at either side; also, there is sufficient play allowed in the link to permit heavy trains being started by the engines backing up, and then drawing them car by car. By this appliance, should the cars jump the track, they become uncoupled by the bolts dropping out.

Having thus described the construction and operation of my invention, what I claim, and desire to secure by Letters Patent of the United States, is—

1. A coupling-link, D, for cars, provided with a hinged diagonal drop-bolt, F, for coupling, substantially as and for the purposes set forth.

2. The combination of a coupling-link, D, having a diagonal drop-bolt, F, for coupling, and a cut-out draw-head, A, provided with interior trip or trigger C, bent-rod lever E, extending to both sides of the car, to be held by a ratchet, E, substantially as and for the purposes specified.

In testimony that I claim the foregoing as my own I affix my signature in presence of two witnesses.

JOHN COWAN COPE.

Witnesses:
 JAMES OGDEN,
 S. M. DOUGHERTY.